US008279147B2

(12) United States Patent
Lee et al.

(10) Patent No.: US 8,279,147 B2
(45) Date of Patent: Oct. 2, 2012

(54) LIQUID CRYSTAL DISPLAY DEVICE HAVING PROTECTIVE CIRCUITS AND METHOD OF MANUFACTURING THE SAME

(75) Inventors: Gi-Chang Lee, Seoul (KR); Il-Gon Kim, Seoul (KR); Won-Chang Chung, Seoul (KR); Cheol-Min Kim, Seongnam-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 948 days.

(21) Appl. No.: 11/865,468

(22) Filed: Oct. 1, 2007

(65) Prior Publication Data

US 2008/0111803 A1 May 15, 2008

(30) Foreign Application Priority Data

Nov. 10, 2006 (KR) ........................ 10-2006-0110908

(51) Int. Cl.
*G09G 3/36* (2006.01)
*G02F 1/141* (2006.01)

(52) U.S. Cl. .......................................... 345/87; 345/904

(58) Field of Classification Search .................. 345/904, 345/87, 92, 99, 100; 349/40
See application file for complete search history.

(56) References Cited

U.S. PATENT DOCUMENTS 6,493,047 B2 * 12/2002 Ha .................................. 349/40
6,624,857 B1 9/2003 Nagata et al.
6,696,701 B2 * 2/2004 Hector et al. .................... 257/72
6,717,629 B2 4/2004 Sumi et al.
7,132,846 B2 * 11/2006 Kim et al. ................ 324/760.02
7,379,127 B2 * 5/2008 Tsao ............................... 349/40
2002/0101547 A1 * 8/2002 Lee et al. ........................ 349/40
2007/0030408 A1 * 2/2007 Lin et al. .......................... 349/40

FOREIGN PATENT DOCUMENTS

CN 1412735 4/2003
CN 1748237 3/2006
JP 09329796 A * 12/1997

(Continued)

OTHER PUBLICATIONS

English Abstract for Publication No. CN 1748237, Mar. 15, 2006.

(Continued)

*Primary Examiner* — Chanh Nguyen
*Assistant Examiner* — Adam J Snyder
(74) *Attorney, Agent, or Firm* — F. Chau & Associates, LLC

(57) ABSTRACT

A display device includes a plurality of pixels connected with a plurality of gate lines and a plurality of data lines, a data driving part applying a data signal to the plurality of data lines, a gate driving part applying a gate signal to the plurality of gate lines, and a plurality of protection circuits connected with the plurality of data lines, wherein each of the plurality of protection circuits comprises a first transistor including a control terminal connected with a first signal line, an input terminal connected with a data line, and an output terminal connected with a second signal line, a second transistor including a control terminal connected with the second signal line, an input terminal connected with the second signal line, and an output terminal connected with the first signal line, and a storage capacitor is connected between the control terminal of the first transistor and the output terminal of the first transistor.

5 Claims, 5 Drawing Sheets

FOREIGN PATENT DOCUMENTS

| | | |
|---|---|---|
| JP | 11-142888 | 5/1999 |
| JP | 11-154733 | 6/1999 |
| JP | 2000-147557 | 5/2000 |
| JP | 2002-099224 | 4/2002 |
| JP | 2003-121867 | 4/2003 |
| JP | 2003-263120 | 9/2003 |
| JP | 2003-322874 | 11/2003 |
| JP | 2005-274932 | 10/2005 |
| JP | 2006-100386 | 4/2006 |
| KR | 100294684 | 4/2001 |
| KR | 10-0298995 | 6/2001 |
| KR | 1020030050578 | 6/2003 |
| KR | 100451380 | 9/2004 |
| KR | 1020050050278 | 5/2005 |
| KR | 1020050087233 | 8/2005 |
| KR | 1020050110745 | 11/2005 |

OTHER PUBLICATIONS

English Abstract for Publication No. CN 1412735, Apr. 23, 2003.
English Abstract for Publication No. 2002-099224, Apr. 5, 2002.
English Abstract for Publication No.: 11-154733.
English Abstract for Publication No.: 2000-147557.
English Abstract for Publication No.: 2006-100386.

* cited by examiner

LIQUID CRYSTAL DISPLAY DEVICE HAVING PROTECTIVE CIRCUITS AND METHOD OF MANUFACTURING THE SAME

CROSS-REFERENCE TO RELATED APPLICATION

The present application claims priority to Korean Patent Application No. 2006-110908, filed on Nov. 10, 2006, the disclosure of which is incorporated herein by reference in its entirety.

BACKGROUND OF THE INVENTION

1. Technical Field

The present disclosure relates to a liquid crystal display device and a driving method of the same, and more particularly, to a liquid crystal display device having a protection circuit used in connection with inspecting the liquid crystal display device and discharging electrostatic discharge.

2. Discussion of the Related Art

Flat panel display devices, such as, for example, a liquid crystal display (LCD), a filed emission display (FED), an organic light emitting display (OLED), and a plasma display panel (PDP), may be thinner and lighter compared to other display devices, such as, for example, a cathode ray tube (CRT).

The flat panel display devices can have a plurality of pixels formed in a matrix and display an image by adjusting the transmittance of light of each of the pixels. The LCD device includes an array substrate having a pixel electrode, a substrate having a common electrode and a liquid crystal layer interposed between the two substrates. The liquid crystal layer has a dielectric anisotropy characteristic. The LCD device applies an electric field to the liquid crystal layer and displays a desired image by adjusting an intensity of the electric field and controlling the transmittance of light transmitted through the liquid crystal layer.

A visual inspection to check a charge rate of each of the pixels can be performed for the LCD device. When a conventional visual inspection is performed, an inspection voltage is applied to a plurality of data lines connected with each other. After a charge rate of the pixels is measured, each of the data lines is cut by a laser trimming process. Alternatively, after a switching element is connected with each of the data lines and the visual inspection is performed by applying an inspection voltage, a turn-off voltage can be applied to the switching element.

However, the laser trimming process uses a process of cutting the data lines with a laser. This may increase a manufacturing cost. When electrostatic discharge is generated, a process of turning off the switching element can be slowed.

SUMMARY OF THE INVENTION

According to an exemplary embodiment of the present invention, a display device includes a plurality of pixels connected with a plurality of gate lines and a plurality of data lines, a data driving part applying a data signal to the plurality of data lines, a gate driving part applying a gate signal to the plurality of gate lines, and a plurality of protection circuits connected with the plurality of data lines, wherein each of the plurality of protection circuits comprises a first transistor including a control terminal connected with a first signal line, an input terminal connected with a data line, and an output terminal connected with a second signal line, a second transistor including a control terminal connected with the second signal line, an input terminal connected with the second signal line, and an output terminal connected with the first signal line, and a storage capacitor is connected between the control terminal of the first transistor and the output terminal of the first transistor.

The first signal line and the second signal line can be formed along an array of the protection circuits and connected with the protection circuits.

The first signal line and the second signal line can be connected with a guard ring.

The first transistor and the second transistor can include a same conductive type.

According to an exemplary embodiment of the present invention, a method of manufacturing a display device comprises forming a display substrate including a gate line, a thin film transistor, a pixel electrode and a protection circuit, discharging electrostatic discharge through the protection circuit, and inspecting the display substrate using the protection circuit to apply an inspection voltage.

The protection circuit may comprise a first transistor including a control terminal connected with a first signal line, an input terminal connected with a data line, and an output terminal connected with a second signal line, a second transistor including a control terminal connected with the second signal line, an input terminal connected with the second signal line, and an output terminal connected with the first signal line, and a storage capacitor is connected between the control terminal of the first transistor and the output terminal of the first transistor.

Forming the display substrate may comprise connecting the first signal line and the second signal line with a guard ring, applying a turn-off voltage to the first signal line and the second signal line, and disconnecting the guard ring from the first and second signal lines.

Inspecting the display substrate may comprise applying a turn-on voltage to the first signal line, applying the inspection voltage to the second signal line, applying a gate-on voltage to a gate line, and detecting luminance of a pixel with respect to the inspection voltage.

The inspection voltage may include a voltage corresponding to a highest gray.

Inspecting the display substrate may further comprise visually inspecting the display device and applying different inspection voltages to the second signal line.

The method may further comprise applying a turn-off voltage to the first signal line and the second signal line after inspecting the display substrate.

The first transistor and the second transistor may include a same conductive type.

BRIEF DESCRIPTION OF THE DRAWINGS

Exemplary embodiments of the present invention can be understood in more detail from the following descriptions taken in conjunction with the accompanying drawings, in which.

DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein.

Figure 1:
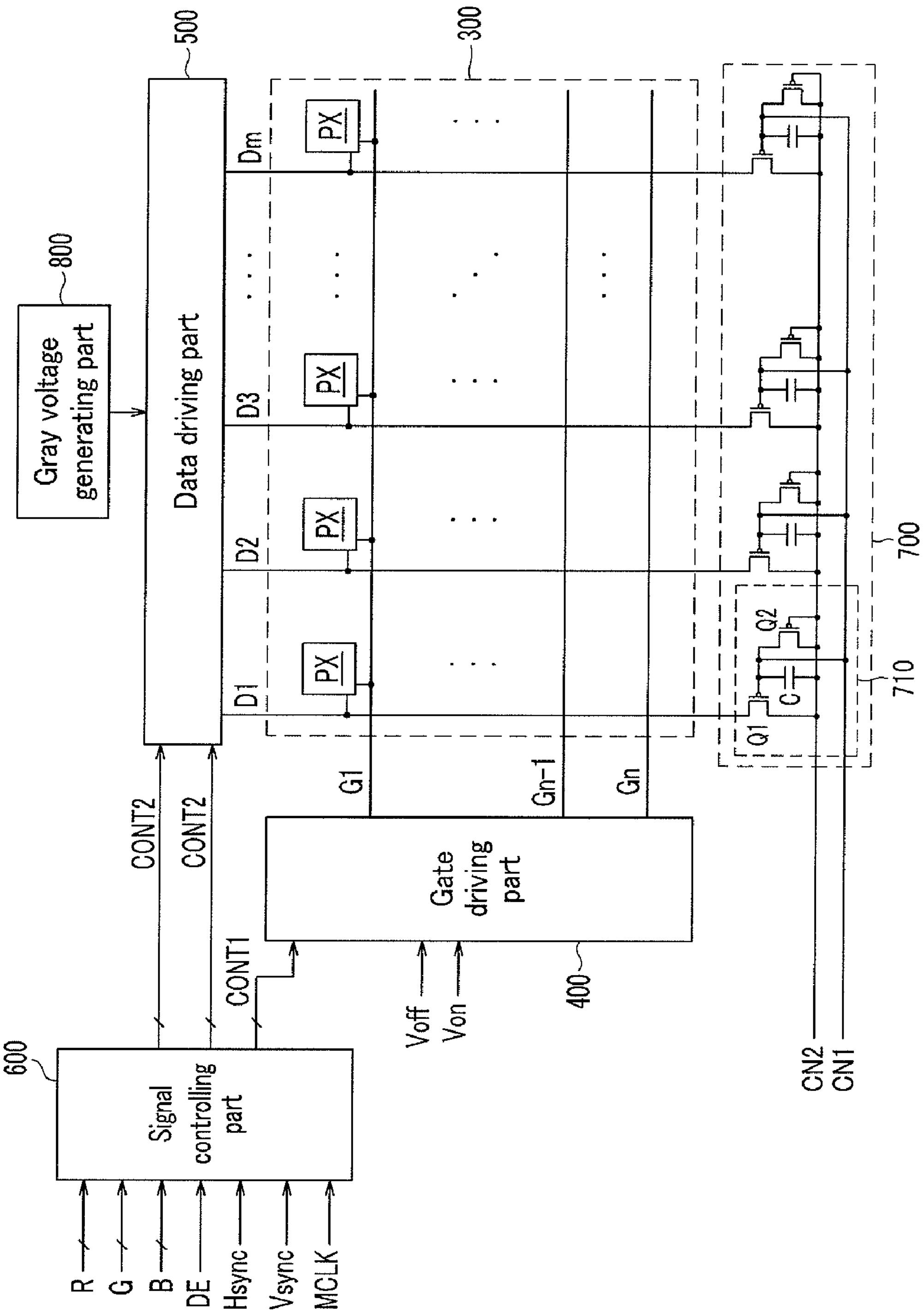
FIG. 1 is a block diagram of a display device in accordance with an exemplary embodiment of the present invention.

FIG. 1 is a block diagram of a display device in accordance with an exemplary embodiment of the present invention.

Referring to FIG. 1, a display device includes a liquid crystal panel assembly 300, a gate driving part 400, a data driving part 500, a gray voltage generating part 800, a protection part 700 and a signal controlling part 600.

The liquid crystal panel assembly 300 includes a plurality of signal lines G1-Gn, D1-Dm and a plurality of pixels PX connected to the signal lines G1-Gn, D1-Dm. The pixels PX are formed in a matrix.

Figure 2:
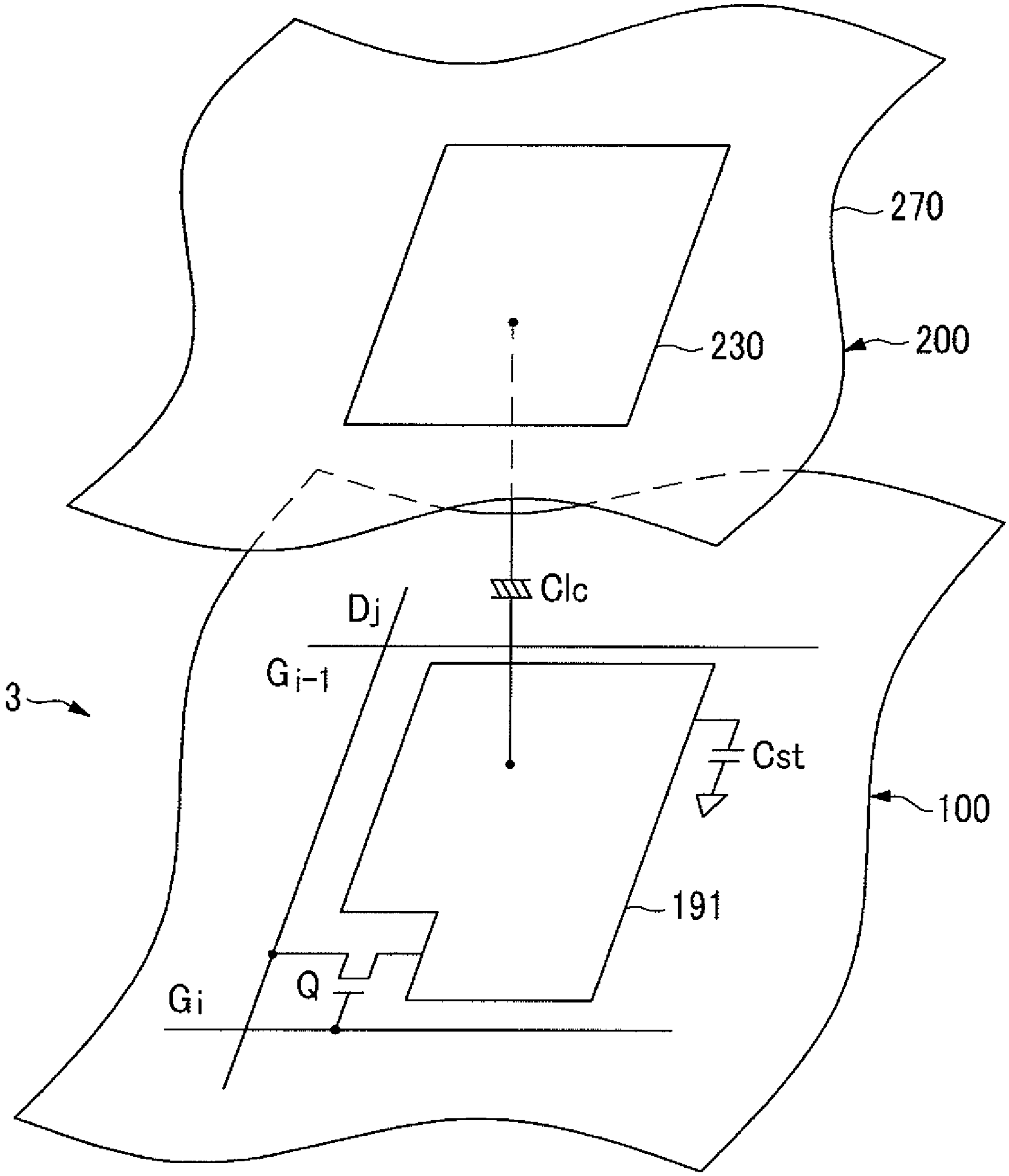
FIG. 2 is an equivalent circuit diagram of a pixel in accordance with an exemplary embodiment of the present invention.

Referring to FIG. 2, the liquid crystal panel assembly 300 includes a first substrate 100, a second substrate 200, and a liquid crystal layer 3 interposed between the first substrate 100 and the second substrate 200.

The signal lines G1-Gn, D1-Dm include a plurality of gate lines G1-Gn transmitting gate signals and a plurality of data lines D1-Dm transmitting data signals. The gate lines G1-Gn are formed substantially parallel to each other in a row direction. The data lines D1-Dm are substantially parallel to each other in a column direction.

For example, a pixel connecting an i-th gate line (i=1, 2, . . . , n) and a j-th data line (j=1, 2, . . . , m) can include a switching element Q connecting signal lines Gi, Dj, a liquid crystal capacitor Clc and a storage capacitor Cst. The storage capacitor Cst can be omitted.

The switching element Q may include, for example, a thin film transistor (TFT) having three terminals. The switching element Q can be formed on the first substrate 100. A control terminal of the switching element Q is connected with the gate line Gi, and an input terminal of the switching element Q is connected with the data line Dj. An output terminal of the switching element Q is connected with the liquid crystal capacitor Clc and the storage capacitor Cst. The TFT can include, for example, amorphous silicon and/or polycrystalline silicon.

The storage capacitor Cst includes a pixel electrode 191 of the first substrate 100, a common electrode 270 of the second substrate 200 and the liquid crystal layer 3. The pixel electrode 191 and the common electrode 270 function as two electrodes of the storage capacitor Cst and the liquid crystal layer 3 functions as a dielectric material.

The pixel electrode 191 is connected with the switching element Q. The common electrode 270 is formed on the second substrate 200 and receives a common voltage Vcom.

The common electrode 270 can be formed on the first substrate 100. When the common electrode 270 is formed on the first substrate 100, at least one of two electrodes 191, 270 may be a linear type electrode or a bar type electrode.

The storage capacitor Cst functioning as an auxiliary capacitor of the liquid crystal capacitor Clc includes a separate signal line (not shown) formed on the first substrate 100, the pixel electrode 191, and an insulator interposed between the separate signal line and the pixel electrode 191. The separate signal line may receive a constant voltage, for example, the common voltage Vcom. Alternatively, the storage capacitor Cst can include the pixel electrode 191 and an electrode overlapping a previous gate line.

To display color images, each pixel displays one of the primary colors, or displays the primary colors alternately according to time. Then, the display device displays color images by mixing the primary colors spatially or temporally.

The primary colors may include, for example, a red color, a blue color, and/or a green color.

Referring to FIG. 2, each pixel can include one color filter 230 of the primary colors in an area of the second substrate 200 corresponding to the pixel electrode 191. The color filter 230 can be formed above the pixel electrode 191 of the first substrate 100 or under the pixel electrode 191 of the first substrate 100.

At least one polarizer (not shown) can be attached to the outside of the liquid crystal panel assembly 300 to polarize light.

A gray voltage generating part 800 generates two pairs of gray voltages in connection with a transmittance rate of a pixel PX. A first pair of gray voltages may have a positive value with respect to the common voltage Vcom. A second pair of gray voltages may have a negative value with respect to the common voltage Vcom. A number of gray voltages in a pair of a gray voltage group generated from the gray voltage generating part 800 can be substantially the same as a number of the gray scale, which can be performed by the display device.

The gate driving part 400 is connected with the gate lines G1-Gn of the liquid crystal panel assembly 300. The gate driving part 400 applies gate signals including a gate-on voltage Von and a gate-off voltage Voff to the gate lines G1-Gn.

The data driving part 500 is connected with the data lines D1-Dm of the liquid crystal panel assembly 300. The data driving part 500 receives the gray voltage of the gray voltage generating part 800 and applies the gray voltage, which functions as a data voltage, to the data lines D1-Dm.

The protection part 700 protects the liquid crystal panel assembly 300 from electrostatic discharge. The protection part 700 can be formed on an opposite side of the data driving part 500 and is connected to the data lines D1-Dm. The protection part 700 includes a plurality of protection circuits 710 connected to the data lines D1-Dm. The protection circuits 710 are connected to, for example, a first signal line CN1 and a second signal line CN2 extended in a row direction with respect to the liquid crystal panel assembly 300. Then, the protection circuits 710 can receive a first signal and a second signal at the same time.

Each of the protection circuits 710 may include a first transistor Q1, a second transistor Q2, and a capacitor C.

The first transistor Q1 includes a control terminal connected to the first signal line CN1, an input terminal connected to the data liens D1-Dm and an output terminal connected to the second signal line CN2.

The second transistor Q2 includes an output terminal connected to the first signal line CN1, a control and input terminal connected to the second signal line CN2.

The storage capacitor C is connected between the control terminal of the first transistor Q1 and the output terminal of the first transistor Q1.

The first transistor Q1 and the second transistor Q2 may have the same conductive type, for example, p-type or n-type.

The signal controlling part 600 controls the gate driving part 400, the data driving part 500, and the protection part 700.

Each of the driving parts 400, 500, 600, 700, 800 can be integrated with the liquid crystal panel assembly 300 including the signal lines G1-Gn, D1-Dm and the switching element Q.

Each of the driving parts 400, 500, 600, 700, 800 can be integrated so that they can be formed in at least one integrated circuit chip. Then, the driving parts 400, 500, 600, 700, 800 can be attached to the liquid crystal panel assembly 300.

Each of the driving parts 400, 500, 600, 700, 800 can be formed on a flexible printed circuit film (not shown) or a separate printed circuit board (not shown). Then, the driving parts 400, 500, 600, 700, 800 can be attached to the liquid crystal panel assembly 300.

Each of the driving parts 400, 500, 600, 700, 800 can be integrated in a single chip. When the driving parts 400, 500, 600, 700, 800 are integrated in a single chip, at least one part or one circuit can be formed outside of the single chip.

The signal controlling part 600 receives input image signals (R, G, B) from an external graphic controller (not shown) and an input control signal to control display of the input image signals (R, G, B). The input image signals (R, G, B) include luminance information of each of the pixels PX. The luminance information may include gray scale information. The input control signal may include, for example, a vertical synchronization signal Vsync, a horizontal synchronization signal Hsync, a main clock MCLK and/or a data enable signal DE.

The signal controlling part 600 is supplied with the input image signals (R, G, B) to be suitable for the operation of the liquid crystal panel assembly 300 on the basis of the input image signals (R, G, B) and the input control signal.

After the signal controlling part 600 generates gate control signals CONT1 and data control signals CONT2, the gate control signals CONT1 are applied to the gate driving part 400, and the data control signals CONT2 and image data DAT are applied to the data driving part 500.

The gate control signals CONT1 may include a scanning start signal STV for instructing to start scanning and at least one clock signal for controlling an output time of the gate-on voltage Von. The gate control signal CONT1 may further include an output enable signal OE for defining the duration of the gate-on voltage Von.

The data control signals CONT2 may include a horizontal synchronization start signal STH to inform the start of data transmission for image data DAT of a group of pixels PX, a load signal LOAD to apply the data voltages to the data lines D1-Dm and a data clock signal HCLK. The data control signals CONT2 may further include an inversion signal RVS to reverse the polarity of the data voltages with respect to the common voltage Vcom.

The data driving part 500 receives the image data DAT and converts the image data DAT, which is digital data, into analog data by selecting the gray voltages in response to the data control signals CONT2 from the signal controlling part 600. Then, the analog data is applied to the data lines D1-Dm.

In response to the gate control signals CONT1 from the signal controlling part 600, the gate driving part 400 applies the gate-on voltage Von to the gate lines G1-Gn, thereby turning on the switching element Q connected with the gate lines G1-Gn. Then, the data signals supplied from the data lines D1-Dm are applied to the pixels PX through the switching element Q which is turned-on.

The difference between the data voltage applied to the pixels PX and the common voltage Vcom can be represented as a charging voltage of the liquid crystal capacitor Clc, which can be referred to as a pixel voltage. The orientation of the liquid crystal molecules in the liquid crystal capacitor Clc varies in response to the pixel voltage so that the polarization of light transmitted the liquid crystal layer 3 can be adjusted. The change of polarization represents the change of a transmittance ratio of light passing through the polarizer attached to the liquid crystal panel assembly 300.

By repeating this procedure by a unit of the horizontal period (which is indicated by 1 H and is equal to one period of the horizontal synchronization signal Hsync and the data enable signal DE), the gate lines G1-Gn are sequentially supplied with the gate-on voltage Von, and the pixels PX are supplied with the data voltage during one frame, thereby displaying desired images.

When the next frame starts after finishing one frame, the inversion control signal RVS applied to the data driving part 500 is controlled such that the polarity of the data voltages is reversed, which can be referred to frame inversion. The inversion control signal RVS may also be controlled such that the polarity of the data voltages flowing through a data line in one frame are reversed, which can be referred to line inversion or dot inversion, or the polarity of the data voltages in one packet are reversed, which can be referred to column inversion or dot inversion.

The protection part 700 protects the liquid crystal panel assembly 300 from electrostatic discharge generated internally or externally. In an exemplary embodiment, the protection part 700 can protect the switching element Q of the pixels PX. The electrostatic discharge can be generated during a process of manufacturing the liquid crystal panel assembly 300, a process of rubbing an alignment layer (not shown) of the liquid crystal panel assembly 300, or a process of attaching the polarizer.

Figure 3:
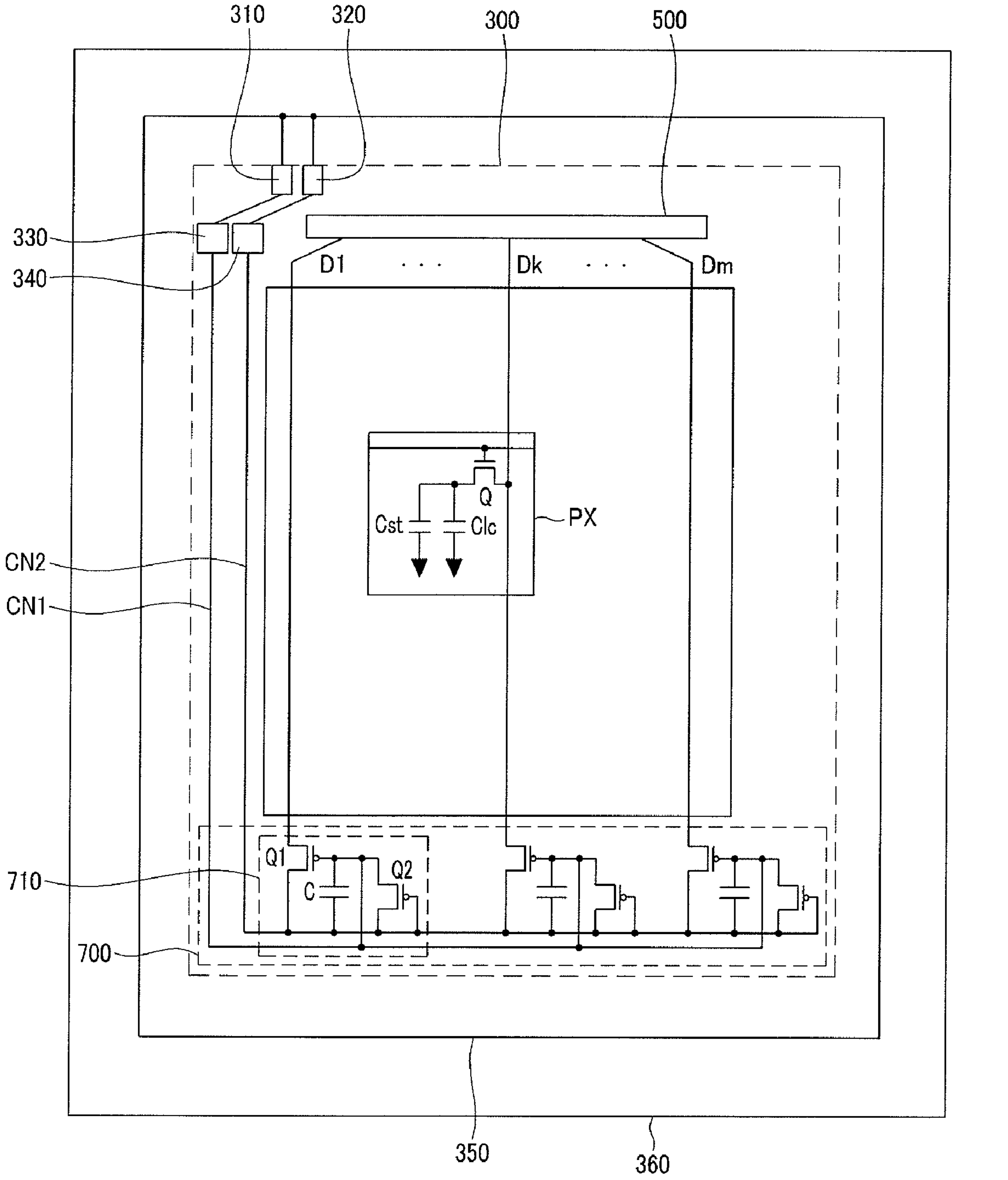
FIG. 3 is a block diagram of a display device in accordance with an exemplary embodiment of the present invention.

FIG. 3 is a block diagram of a display device in accordance with an exemplary embodiment of the present invention.

Figure 4:
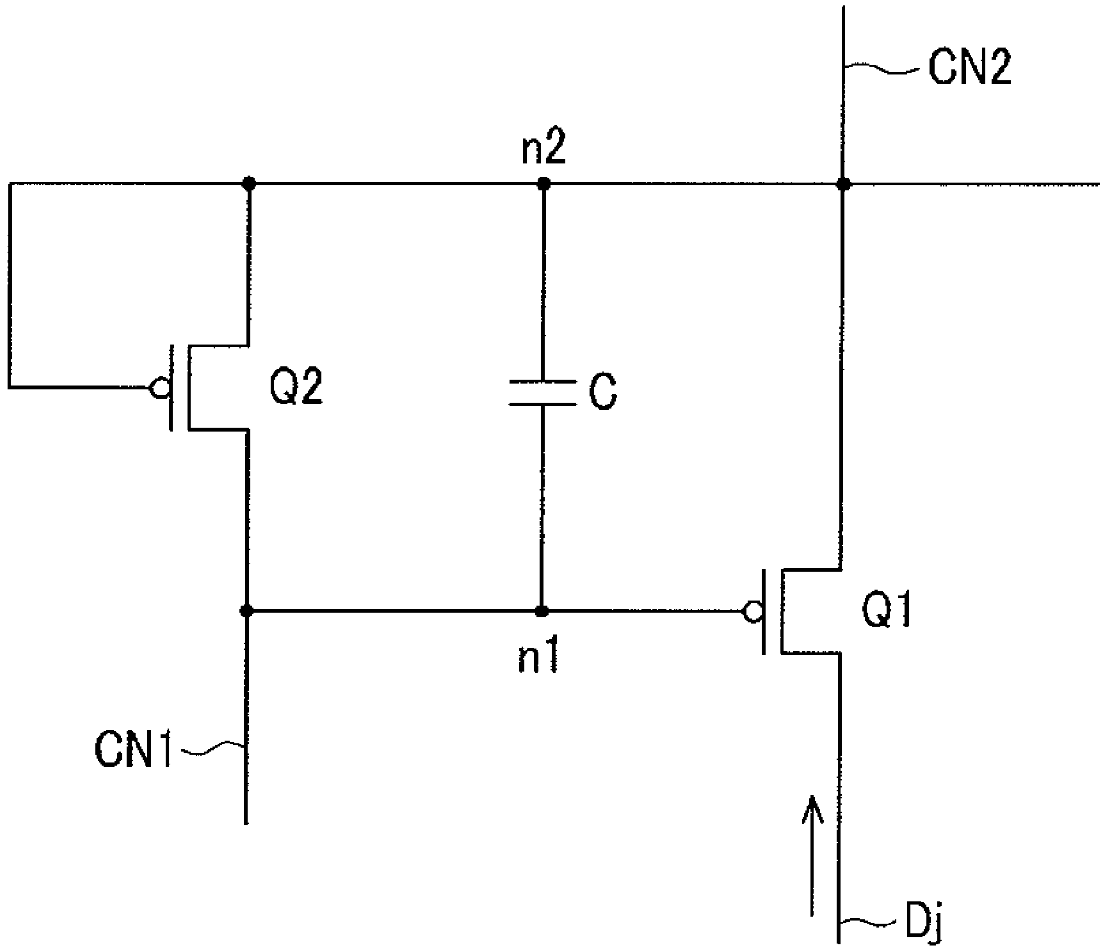
FIG. 4 is a circuit diagram for showing a protection circuit in accordance with an exemplary embodiment of the present invention.

FIG. 4 is a circuit diagram showing a protection circuit in accordance with an exemplary embodiment of the present invention.

Referring to FIG. 3, the liquid crystal panel assembly 300 may include a plurality of pixels PX, the data driving part 500, the protection part 700 and the first and second signal lines CN1, CN2 formed on a mother board assembly 360.

The first and second signal lines CN1, CN2 may include flexible printed circuit (FPC) pads 310, 320 connected with an external flexible printed circuit film (not shown) and a first and second inspection pads 330, 340 connected with the FPC pads 310, 320.

The FPC pads 310, 320 are located in the peripheral area of the liquid crystal panel assembly 300. After the FPC film is attached, the FPC pads 310, 320 receive signals from the FPC film. The signals received from the FPC film are transmitted to the first and second inspection pads 330, 340.

Since a plurality of the liquid crystal panel assembly 300 is formed on a mother board assembly 360, the liquid crystal panel assembly 300 can be produced by cutting the mother board assembly 360 along a cutting line.

A guard ring 350 is formed around the cutting line to discharge electrostatic discharge, which can be generated during a manufacturing process. The guard ring 350 is connected with the FPC pads 310, 320 and applies a voltage to turn-off the transistors Q1, Q2.

Referring to FIG. 4, when the transistors Q1, Q2 are p-type transistors, voltage applied to the guard ring 350 is, for example, about 10V, which can keep the transistors Q1, Q1 turned-off.

When electrostatic discharge having a high voltage occurs in the data lines D1-Dm for a rubbing process, a control terminal voltage of the transistor Q1 may have a lower level than that of an input terminal voltage, thereby the transistor Q1 is turned-on. Then, the electrostatic discharge is discharged to the guard ring 350 through the second signal line CN2.

The storage capacitor C decreases the high voltage difference between the control terminal of the transistor Q1 and the input terminal of the transistor Q2 by raising a voltage of a first point n1 in response to a voltage rising of a second point n2. Accordingly, the transistor Q1 can continuously maintain turn-on status due to the high voltage of the electrostatic discharge generated in the data line Dj, and can discharge the electrostatic discharge through the guard ring 350.

When the voltage difference between the control terminal of the transistor Q1 and the input terminal of the transistor Q1 is large, the voltage difference between the control terminal and the input terminal of the transistor Q1 can be reduced in a short time using the storage capacitor C. Accordingly, the electrostatic discharge can be discharged while protecting the transistor Q1.

When the electrostatic discharge of the data line Dj is discharged through the second signal line CN2, the voltage of the data line Dj is decreased, so that the transistor Q1 is turned-off. Remaining voltage of the first and second points n1, n2 is discharged through the first and second signal lines CN1, CN2.

When electrostatic discharge is generated from lines other than the data line Dj, for example, the first signal line CN1, the transistor Q2 is turned-on. The electrostatic discharge is discharged to the guard ring 350 through the second signal line CN2 via the turned-on transistor Q2. The transistor Q1 maintains the turned-off status.

After the liquid crystal panel assembly 300 is cut along the cutting line, a visual inspection is performed. The visual inspection applies the inspection voltage to the pixels PX through the data lines D1-Dm, and detects the luminance of the pixels PX.

When the visual inspection is performed, a turn-on voltage of the transistor Q1 is applied to the first signal line CN1, and an inspection voltage of the transistor Q2 is applied to the second signal line CN2.

When the transistors Q1, Q2 are p-type transistors, a turn-on voltage Vcn1 can be, for example, −10V, an inspection voltage can be a voltage corresponding to the highest gray of the pixel PX, for example, 3.8V. The inspection voltage Vcn2 can be a voltage corresponding to other gray scales per every frame.

When the transistor Q1 is turned-on according to the turn-on voltage Vcn1 of the first signal line CN1, the inspection voltage Vcn2 is applied to the data line Dj through the transistor Q1. The gate driving part 400 outputs the gate-on voltage Von to the corresponding gate line Gi, the switching element Q of the corresponding pixel PX is turned-on by the gate-on voltage Von. Then, the inspection voltage Vcn2 is charged to the liquid crystal capacitor Clc, thereby transmitting luminance of light thereof.

After the luminance of the corresponding pixel PX is measured by eyes or apparatus, a defective pixel is detected.

Figure 5:
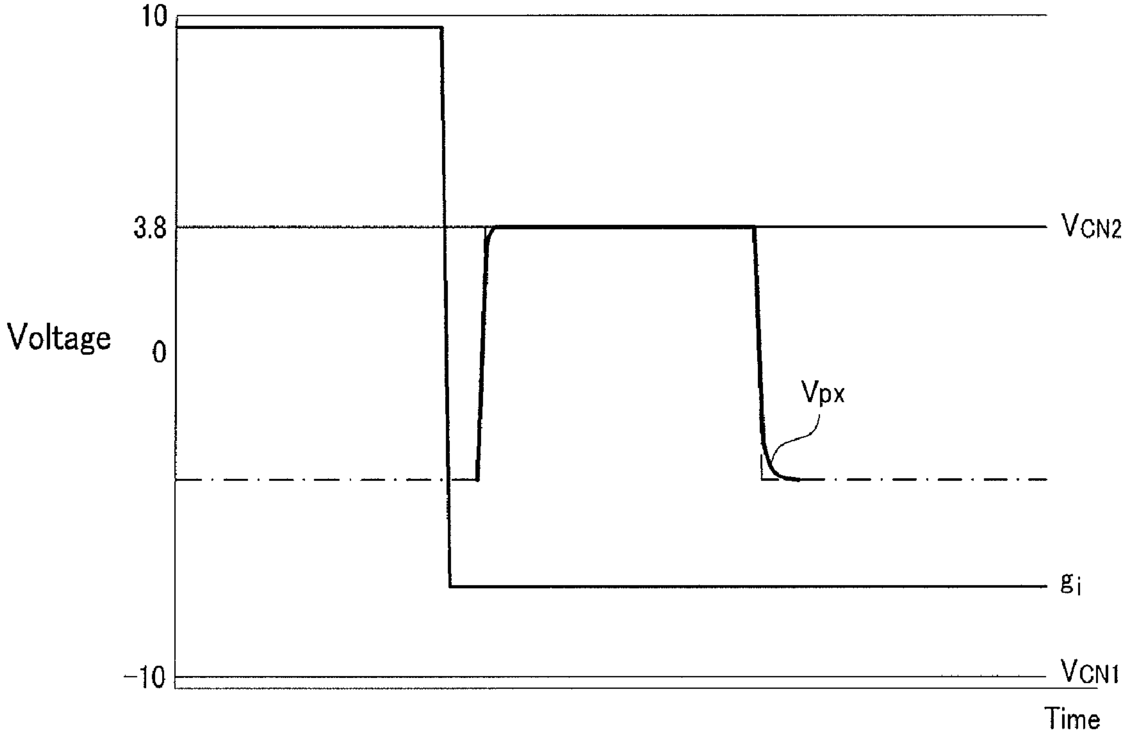
FIG. 5 is a signal waveform diagram illustrating visual inspection in accordance with an exemplary embodiment of the present invention.

FIG. 5 is a signal waveform diagram illustrating a visual inspection in accordance with an exemplary embodiment of the present invention.

Referring to FIG. 5, by comparing the pixel voltage Vpx corresponding to measured luminance to the inspection voltage Vcn2, a charging rate of each pixel PX is determined. The transistor Q2 of the protection circuit 710 maintains the turned-off status.

The visual inspection can be performed to all pixels PX by applying the gate-on voltage Von to the all gate lines G1-Gn in turns. For example, after the visual inspection is performed, the turn-off voltage, for example, 10V, is applied to the first signal line CN1, thereby turning-off the transistor Q1.

When the visual inspection is performed through the protection circuit 710 connected with each data line D1-Dm, the luminance of the pixels PX can be measured by changing the inspection voltage Vcn2 more than one time. The cost of manufacture can be decreased since a cutting process for cutting the data lines D1-Dm using laser after the visual inspection is omitted.

After the visual inspection is performed, when the display device displays images, the turn-off voltage, for example, 10V is applied to the first and second signal lines CN1, CN2 so that the transistors Q1, Q2 are turned-off. The protection part 700 functions as an electrostatic discharge protection circuit.

When a manufacturing process or displaying is performed, a protection circuit according to an exemplary embodiment of the present invention functions as a electrostatic discharge protection circuit. When a visual inspection is performed, a protection circuit according to an exemplary embodiment of the present invention functions as an inspection voltage transmitter so that the manufacturing cost can be decreased by reducing the size of circuit and the process steps.

With the protection circuit, the transistors can be protected from stress applied thereon by decreasing a gate-source voltage of the transistor through the storage capacitor.

Although the exemplary embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method of manufacturing a display device comprising:

forming a display substrate including a data line, a thin film transistor, a pixel electrode, a protection circuit connected to the data line, first and second signal lines connected to the protection circuit, and a single guard ring, wherein an electrostatic discharge occurring during manufacture of the display substrate is discharged through the protection circuit; and inspecting the display substrate using the protection circuit to apply an inspection voltage, wherein forming the display substrate comprises connecting the first signal line and the second signal line with the guard ring, applying a turn-off voltage from the guard ring to the first signal line and the second signal line to turn off transistors in the protection circuit, and disconnecting the guard ring from the first and second signal lines; and wherein the protection circuit comprises a first transistor including a control terminal connected with a first signal line, an input terminal connected with the data line, and an output terminal connected with a second signal line, a second transistor including a control terminal connected with the second signal line, an input terminal connected with the second signal line, and an output terminal connected with the first signal line, and a storage capacitor is connected between the control terminal of the first transistor and the second signal line proximal to the output terminal of the first transistor, and wherein inspecting the display substrate comprises:

applying a turn-on voltage of the first transistor to the first signal line;

applying the inspection voltage of the second transistor to the second signal line, whereby when the first transistor is turned on by the turn on voltage, the inspection voltage is applied to a data line through the first transistor;

applying a gate-on voltage to a gate line whereby a switching element of a corresponding pixel is turned on; and detecting luminance of a pixel with respect to the inspection voltage.

2. The method of claim 1, wherein the inspection voltage includes a voltage corresponding to a highest gray.

3. The method of claim 1, wherein inspecting the display substrate further comprises visually inspecting the display substrate and applying different inspection voltages to the second signal line.

4. The method of claim 3, further comprising:

applying a turn-off voltage to the first signal line and the second signal line after inspecting the display substrate.

5. The method of claim 4, wherein the first transistor and the second transistor include a same conductive type.

* * * * *